United States Patent [19]
Frost et al.

[11] Patent Number: 5,290,004
[45] Date of Patent: Mar. 1, 1994

[54] COLLAPSIBLE CHRISTMAS TREE STAND

[75] Inventors: David Frost; Matthew Leung, both of Long Beach, Calif.

[73] Assignee: Lincoln Imports Ltd., Inc., Placentia, Calif.

[21] Appl. No.: 71,927

[22] Filed: Jun. 3, 1993

Related U.S. Application Data

[63] Continuation of Ser. No. 015542, Feb. 9, 1993, abandoned.

[51] Int. Cl.$^5$ ............................................. F16M 11/00
[52] U.S. Cl. ................... 248/528; 248/188.7; 47/40.5
[58] Field of Search ............... 248/528, 529, 523, 527, 248/153, 166, 440.1, 188.7; 47/40.5

[56] References Cited

U.S. PATENT DOCUMENTS

| 781,552 | 1/1905 | Riek | 248/528 X |
|---|---|---|---|
| 830,671 | 9/1906 | Neff . | |
| 1,559,563 | 11/1925 | Edmister | 248/528 |
| 1,575,488 | 3/1926 | Jakobey . | |
| 1,912,054 | 5/1933 | Wright . | |
| 2,500,215 | 3/1950 | Swearingen | 248/46 |
| 2,531,690 | 11/1950 | Kennel | 248/46 |
| 2,670,163 | 2/1954 | Armitage | 248/47 |
| 2,699,308 | 1/1955 | Shackleford | 248/47 |
| 2,786,641 | 3/1957 | Applegate | 248/46 |
| 3,387,808 | 6/1968 | Metcalf | 248/528 |
| 3,526,380 | 9/1970 | Tong | 248/46 |
| 4,288,052 | 9/1981 | Scott | 248/188.7 X |
| 4,406,437 | 9/1983 | Wright | 248/529 |
| 4,763,866 | 8/1988 | Sinchok | 248/528 X |
| 5,022,620 | 6/1991 | Scott | 248/188.7 X |

Primary Examiner—Karen J. Chotkowski
Attorney, Agent, or Firm—Fulwider Patton Lee & Utecht

[57] ABSTRACT

A collapsible Christmas tree stand is disclosed for supporting a Christmas tree or the like from a longitudinal tube supported by two pair of opposing legs. The second pair of legs being rotatable about the tube in relation to a first pair of legs between a storage position and a plurality of support positions. The position of the two pair of legs with respect to one another is maintained with a locking wing nut.

19 Claims, 2 Drawing Sheets

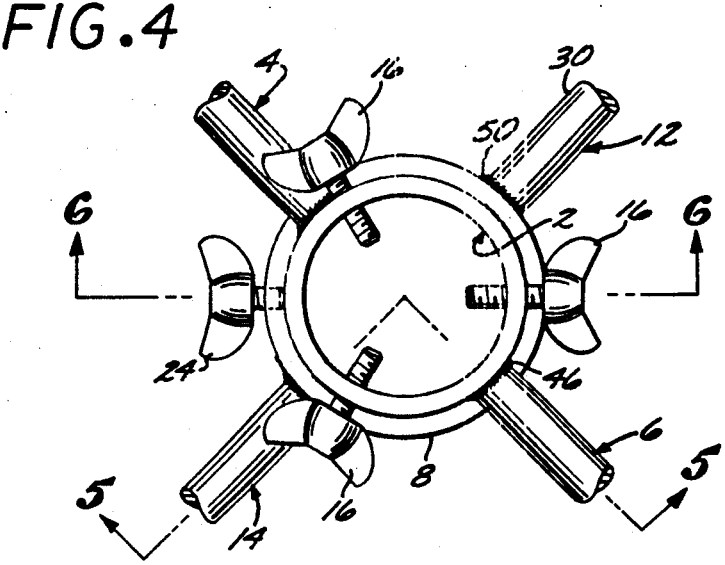
FIG.4
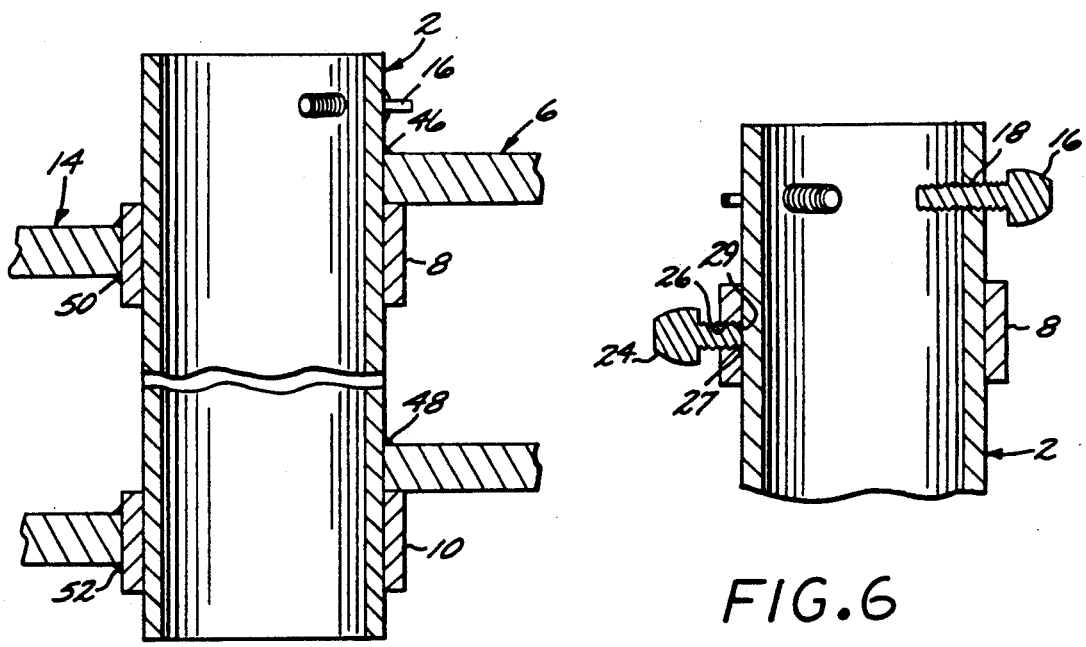
FIG.5
FIG.6
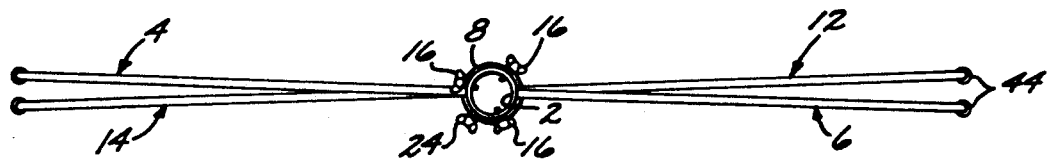
FIG.7

COLLAPSIBLE CHRISTMAS TREE STAND

This is a continuation of copending application Ser. No. 08/015,542 filed on Feb. 4, 1993, now abandoned.

FIELD OF THE INVENTION

This invention relates to a collapsible stand for vertically supporting a pole decorated for display and more particularly to a collapsible stabilized support stand for supporting a Christmas tree.

BACKGROUND OF THE INVENTION

Various collapsible tree stands for vertically supporting a Christmas tree or artificial tree pole have been known in the art for a number of years, and by way of example, several forms of such devices can be found in U.S. Pat. Nos. 830,671, 3,387,808 and 4,763,866. Because these devices relate to seasonal decorations, such as a Christmas tree, and are normally utilized during a brief period of the year, such devices generally spend most of the time in storage and construction of such devices to be collapsible ensures the most efficient storage space. Such prior stands, typically comprising four legs, may be adjusted from a position convenient for storage to a position which will support a Christmas tree by altering the angular displacement of the legs in relation to each other. Furthermore, such stands frequently have included locking mechanisms for maintaining the legs in the supporting position while in use.

Prior tree stands which were adjustable between a support position and a storage position have positioned the support legs at equidistant angular displacement with respect to each other. While a support position wherein the legs are maintained at equidistant spacing may be appropriate for the stable support of a tree stand on a latitudinally level surface with a generally large surface area and for a symmetrically balanced tree, the positioning of the legs at other than equidistant spacing is necessary where the asymmetry of the tree or a configuration of the surface of the display location causes uneven weight distribution. The asymmetry of the tree may be due to the natural growth of a harvested tree or in the case of either an artificial or harvested tree the uneven allocation of lights and decorations. Also, other than equidistant spacing of the legs may be necessary where the surface area is limited in one direction. In homes, especially older homes, settling may occur which may cause slopes or indentations, to appear in the floor or display location. Further, in the commercial setting display locations are arranged to create an eye-catching effect to market the selected goods or services to a customer, typically sloping the display surface toward the viewer or limiting surface area for supporting the tree. A tree used in the display to complete the eye-catching visual effect must be capable of stable support under such conditions. Thus, the need exists for a rugged collapsible tree stand which provides for a simple set up and a stable Christmas tree in the situations described herein and having a simple construction that can be manufactured at a low cost.

SUMMARY OF THE INVENTION

The subject invention provides a tree stand construction which comprises a stable support for a Christmas tree requiring a minimal level of cost for construction and which selectively may lock the position of opposing pairs of legs with respect to each other and with respect to a centrally positioned support cylinder. The position of the opposing pairs of legs is adjustable between a configuration suitable for storage of the stand and as a configuration suitable for providing stable support for a Christmas tree.

The subject invention also provides a stabilized tree stand wherein opposing pairs of legs may also be adjusted within a range of positions suitable for stable support of a Christmas tree having uneven lateral weight distribution across the stand or limited surface area for supporting the tree. The range of positions comprise a change in the angular displacement of the opposing pairs of legs. The position of the legs is selectively adjustable to establish a stable stand for supporting a Christmas tree having a laterally unbalanced weight distribution.

Other features and objects of the invention will become apparent from the following detailed description, taken in conjunction with the accompanying drawings, which illustrate, by way of example, the features of the invention.

BRIEF DESCRIPTION OF THE DRAWINGS

FIG. 4 is a top view of the center portion of the subject invention as identified by Circle 4 in FIG. 1.

FIG. 5 is a cross-sectional side view of the subject invention taken along line 5—5 in FIG. 4;

FIG. 6 is a partial cross-sectional side view of the subject invention taken along line 6—6 in FIG. 4;

FIG. 7 is a top view of the subject invention showing the legs positioned in a manner suitable for storage.

DETAILED DESCRIPTION

Figure 1:
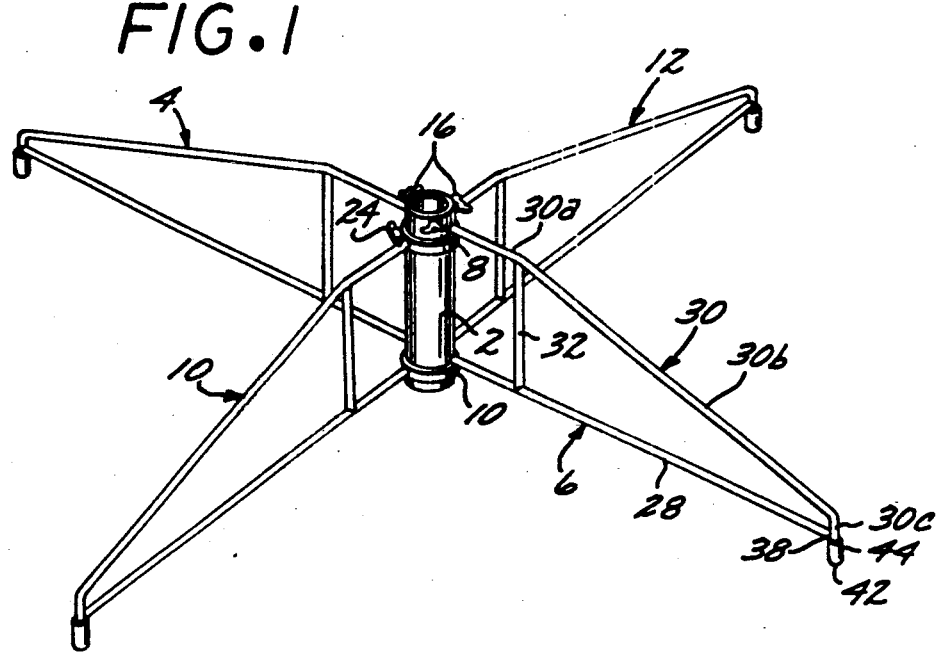
FIG. 1 is a perspective view of the subject invention showing the legs positioned in a manner for supporting a longitudinally positioned pole.
Figure 2:
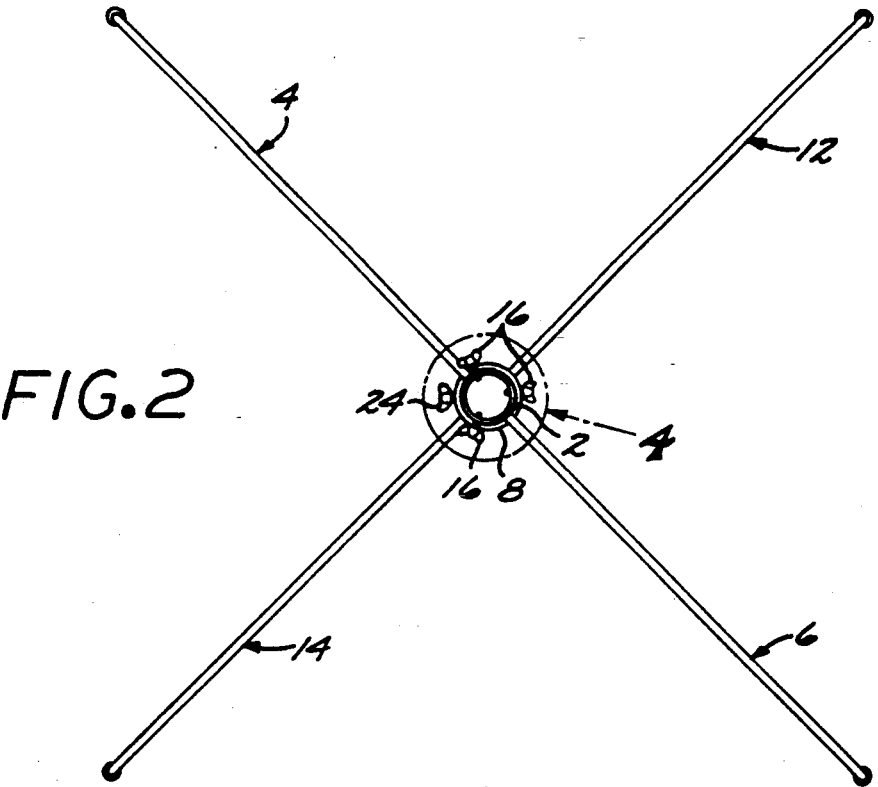
FIG. 2 is a top of the invention shown in FIG. 1.

In general terms, the present invention, as shown in FIG. 1, comprises a cylindrical tube 2 wherein the longitudinal axis of the cylinder 2 is positioned vertically. Connected to the cylinder 2 at upper and lower positions are a first pair of legs 4 and 6 extending radially outward from the longitudinal axis in opposing directions. The angular displacement of opposing leg 4 and 6 is preferably 180°. Two annular rotating collars, upper collar 8 and lower collar 10, are mounted about cylinder 2. A second pair of opposing legs 12 and 14 are connected to the upper collar 8 and lower collar 10 in a 180° angular displacement similar to the first pair of legs 4 and 6. Legs 12 and 14 also extend radially outward from the longitudinal axis of the cylinder 2 in opposing directions. As shown in FIG. 2, when deployed in the preferred support position, the legs 4, 6, 12 and 14 are arranged at 90° with respect to one another in a position that provides stable support for a Christmas tree. The positioning of pairs of legs 4, 6 and 12, 14 is selected according to the lateral distribution of weight of the Christmas tree or surface area available for the support stand. It will be appreciated that varying the positioning of the legs may be used to account for such factors as uneven or sloping support surfaces, limited support surface area, the lateral asymmetry of the Christmas tree, or the uneven arrangement of decorations on the tree.

When the lateral weight distribution of the Christmas tree is balanced and the surface area will permit the arrangement, legs 4, 6, 12 and 14 are arranged at 90° angles with respect to one another as shown in FIG. 2. A plurality of retainers 16 are threaded through threaded apertures 18 (FIG. 6) disposed around the upper portion of the cylinder 2 at equidistant positions along the circumference of the cylinder 2.

A locking device 24 is threaded and extends through a threaded aperture 26 (FIG. 6) in collar 8. The inner end 27 of device 24 adjustably contacts the cylinder 2 at its outer surface 29. In a preferred embodiment locking device 24 is a wing nut.

Figure 3:
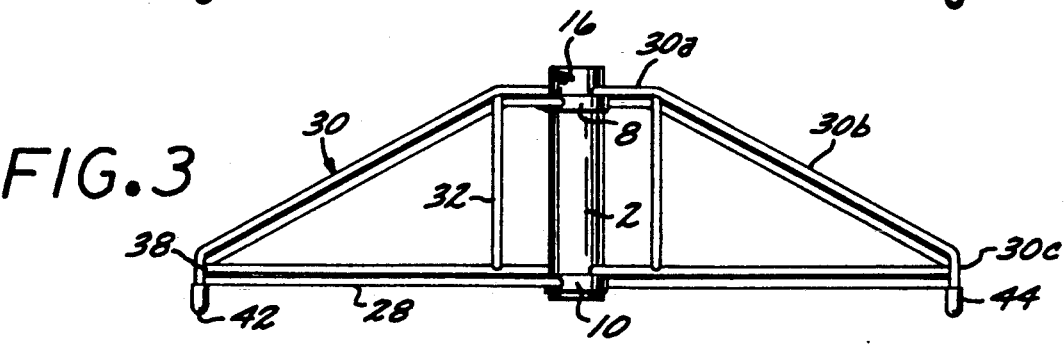
FIG. 3 is a front view of the invention as shown in FIG. 2.

Referring to FIGS. 1 and 3, the legs 4, 6, 12 and 14 each include 3 parts, a lower bar 28, an upper bar 30 and a brace member 32. The lower bar is positioned perpendicularly with respect to the cylinder 2. Upper bar 30 is comprised of three segments. A first segment 30a, located proximate to the cylinder 2, is positioned parallel to the lower bar 28. At an intermediate distance outward from the cylinder 2, the brace member 32 extends between and connects upper bar 30a with the lower bar 28. At the point 31 where the brace member 32 connects to the upper bar 30a, the second segment 30b of the upper bar 30 connects to the first segment 30a and extends downwardly outward from the cylinder 2 toward the lower bar 28. At a point 33 above the distal end 38 of the lower bar 28 the second segment 30b of the upper bar connects to the third segment 30c of the upper bar 30. The third segment 30c of the upper bar 30 connects to and extends beyond the distal end 38 of the lower bar 28. The distal end 42 of the third segment 30c forms a foot or surface contact point for the legs. The foot or surface contact point 42 is preferably enclosed by a cap 44. The cap 44 protects a surface (not shown) from damage which may occur due to direct contact with the surface contact point 42. It will be appreciated that, the arrangement of the leg components in this manner ensures stable lateral support for a Christmas tree. In a preferred embodiment, the segments 30a, b, c of the upper bar 30 are integrally formed from the same bar.

Referring to FIGS. 4-6, the connection of the legs 4, 6, 12 and 14 to the cylinder is shown in detail. First pair of legs 4 and 6 are connected directly to the cylinder 2 at upper 46 and lower 48 contact points. The second pair of legs 12 and 14 are connected to the upper 8 and lower 10 collars of upper and lower contact points, 50 and 52, respectively. The second pair of legs 12 and 14 and collars 8 and 10 are positioned in underlying relationship with the first pair 4 and 6.

Although the collapsible Christmas tree stand may be constructed with any suitable material such as high strength plastic, the preferred embodiment comprises wrought iron components which are attached at the connection points using arc wielding or similar wielding techniques. The retaining elements are preferably metal wing nuts which may be readily obtained from a variety of suppliers; however, any suitable fastening means may be employed. It will be appreciated that any comparable type of construction material may be used to construct this device.

In operation the tree stand legs are positioned so as to place the first pair of legs, 4 and 6, and second pair of legs, 12 and 14, at a selected angular displacement. It will be appreciated that the angular separation of the first and second pair of legs is selected according to the weight distribution requirements of the Christmas tree, the limited surface area available for the stand and to accommodate uneveness in the floor, etc. The Christmas tree trunk (not shown) is contained within the cylinder 2 by the retainers 16. The locking wing nut 24 for the second pair of legs is rotated to frictionally engage the cylinder and lock legs 12 and 14 in position providing stability to the tree stand.

While the preferred embodiment is for an artificial Christmas tree, it will be appreciated that the subject invention may be used in supporting a harvested living Christmas tree by closing the bottom end 2b of cylinder 2 so that it retains fluid. Additionally, a fluid enclosure (not shown) may be attached or coupled to legs 12 and 14 and positioned beneath cylinder 2. It must also be recognized that the subject invention may be utilized in connection with items other than Christmas trees, such as flag poles, etc.

While a particular form of the invention has been illustrated and described, it will be apparent the various modifications can be made without departing from the spirit and scope of the invention.

What is claimed is:

1. A stand for vertically supporting an object comprising;
   a cylindrical tube, one end of said tube adapted for receiving an object;
   a first pair of support legs connected to the exterior surface of said tube, said first pair of support legs extending radially outward from the longitudinal axis of said tube;
   upper and lower annular collars rotatably coupled about said tube;
   a second pair of support legs connected to said upper and lower collars, said second pair of support legs extending radially outward from the longitudinal axis of said tube;
   means for retaining an object within said tube, said retaining means projecting radially through the cylinder toward said longitudinal axis;
   a locking means adjustably positioned through the upper collar, said locking means projecting radially toward the longitudinal axis of the cylinder and selectively positioned in contact with the cylinder;
   wherein said second pair of legs is rotatable with respect to said first pair of legs between a first position to a plurality of second positions.

2. The support stand of claim 1 wherein each of said legs of said first and second pair of legs includes a support member connected at the distal end of said legs.

3. The support stand of claim 1 wherein the legs of said first and second pair of legs further comprise:
   an upper bar;
   a lower bar; and
   a brace member.

4. The support stand of claim 1 wherein said upper annular collar is interposed between said first pair of support legs and said receiving end of said tube.

5. The support stand of claim 1 wherein said first pair of support legs is interposed between said lower annular collar and said receiving end of said tube.

6. The support stand of claim 3 wherein said upper bar of said first pair of legs is interposed between said receiving end of said tube and said upper annular collar.

7. The support stand of claim 3 wherein said lower annular collar is interposed between said receiving end of said tube and said lower bar of said first pair of legs.

8. The support stand of claim 1 wherein said retaining means is disposed proximate to said receiving end of said tube.

9. The support stand of claim 1 wherein said retaining means comprise wing nuts.

10. The support stand of claim 3 wherein said upper bar further comprises three segments; said third segment being said support member.

11. A support stand comprising;
- a cylindrical tube;
- a first pair of support legs connected to the exterior surface of said tube, said first pair of support legs extending radially outward from the longitudinal axis of said tube;
- upper and lower annular collars rotatably coupled about said tube;
- a second pair of support legs connected to said upper and lower collars, said second pair of support legs extending radially outward from the longitudinal axis of said tube;
- said legs of said first and second pair of legs including an upper bar, a lower bar, and a brace member.
- means for retaining an object within said tube, said retaining means projecting radially through the cylinder toward said longitudinal axis;
- a locking means adjustably positioned through the upper collar, said locking means projecting radially toward the longitudinal axis of the cylinder and selectively positioned in contact with the cylinder;
- wherein said second pair of legs are rotatable with respect to said first pair of legs between a first position and a plurality of second positions to support said tube;
- said legs of each of the first and second pair of legs having a radially distant support member.

12. The support stand of claim 1 wherein the legs of said first and second pair of legs further comprise:
- an upper bar;
- a lower bar; and
- a brace member.

13. The support stand of claim 11 wherein said upper annular collar is interposed between said first pair of support legs and said receiving end of said tube.

14. The support stand of claim 11 wherein said first pair of support legs is interposed between said receiving end of said tube and said lower annular collar.

15. The support stand of claim 12 wherein said upper bar of said first pair of legs is interposed between said receiving end of said tube and said upper annular collar.

16. The support stand of claim 12 wherein said lower annular collar is interposed between said receiving end of said tube and said lower bar of said first pair of legs.

17. The support stand of claim 11 wherein said retaining means is disposed proximate to said receiving end of said tube.

18. The support stand of claim 11 wherein said retaining means comprise wing nuts.

19. The support stand of claim 11 wherein said upper bar further comprises three segments with said third segment being said support member.

* * * * *

UNITED STATES PATENT AND TRADEMARK OFFICE
CERTIFICATE OF CORRECTION

PATENT NO. : 5,290,004
DATED : March 1, 1994
INVENTOR(S) : David Frost and Matthew Leung It is certified that error appears in the above-indentified patent and that said Letters Patent is hereby corrected as shown below:

Claim 1
  Column 4, line 36, delete "cylinder" and insert --tube--;

Column 4, line 39, delete "cylinder" and insert --tube--;

Column 4, line 40, delete "cylinder" and insert --tube--;

Claim 11
  Column 5, line 20, delete "cylinder" and insert --tube--.

Column 5, line 23, delete "cylinder" and insert --tube--.

Column 5, line 24, delete "cylinder" and insert --tube--.

Column 6, line 2, delete "distant" and insert --distal--.

Signed and Sealed this

Second Day of July, 1996

*Attest:*

BRUCE LEHMAN

*Attesting Officer*    *Commissioner of Patents and Trademarks*